Nov. 20, 1934.   P. B. HARWOOD   1,981,547
MOTOR CONTROL SYSTEM
Filed Sept. 8, 1933
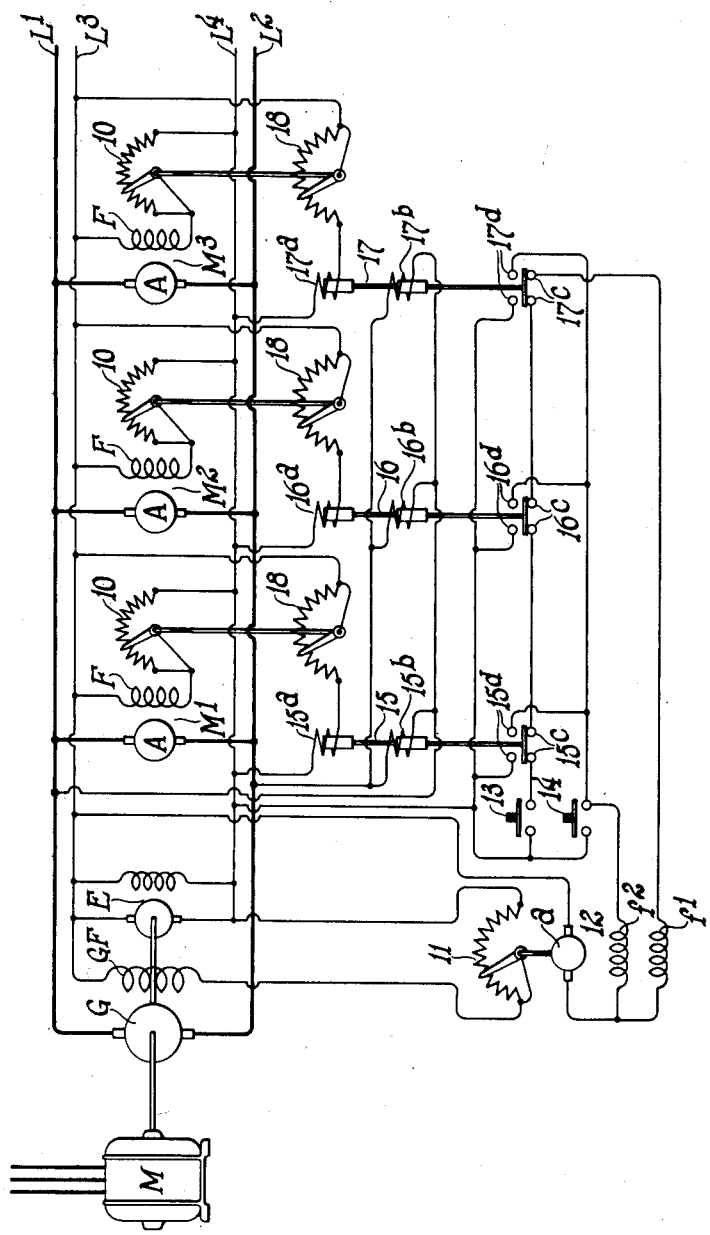
Inventor
Paisley B. Harwood
By Frank H. Hubbard
Attorney Patented Nov. 20, 1934

1,981,547

UNITED STATES PATENT OFFICE 1,981,547

MOTOR CONTROL SYSTEM

Paisley B. Harwood, Milwaukee, Wis., assignor to Cutler-Hammer, Inc., Milwaukee, Wis., a corporation of Delaware Application September 8, 1933, Serial No. 688,572

6 Claims. (Cl. 172—239)

This invention relates to motor control systems, and while not limited thereto is particularly applicable to controllers for rolling mills and similar machines including a plurality of elements or sections which are driven by separate motors.

Machines of the aforesaid character are commonly driven by direct current motors having their armatures connected in parallel across a supply circuit of variable voltage and having their field windings connected in parallel across a supply circuit of substantially constant voltage. In such systems the speed of the several motors is usually varied by varying the voltage of the variable voltage supply circuit and each motor is usually provided with an adjustable field rheostat for varying its speed with respect to the other motors. In practice it has been found that when motors are controlled in this manner any one of the same will usually operate at a dangerous speed if its associated rheostat is adjusted to provide a relatively weak field and its armature is supplied with current of relatively high voltage. The present invention has among its objects to provide a motor control system of the character above described having automatic means associated therewith for preventing operation of any one of the driving motors at a dangerous speed.

Another object is to provide a control system of the aforesaid character having automatic means associated therewith for preventing an increase in voltage of the variable voltage supply circuit when any one of the motors tends to operate at a dangerous speed and for providing for a decrease in voltage of said supply circuit when the field rheostat of any one of the motors is moved to a position which tends to produce a dangerous speed.

Various other objects and advantages of the invention will hereinafter appear.

The accompanying drawing diagrammatically illustrates an embodiment of the invention which will now be described, it being understood that the embodiment illustrated is susceptible of modification without departing from the spirit and scope of the appended claims.

Referring to the drawing, the same illustrates a variable voltage drive for rolling mills and similar machines in which a plurality of direct current motors $M^1$, $M^2$ and $M^3$ are provided for driving different elements or sections of the machine. Each of said motors is provided with an armature A and a field winding F, and the armatures of said motors are connected in parallel across a direct current supply circuit $L^1$—$L^2$ while the field windings thereof are connected across a direct current supply circuit $L^3$—$L^4$. The circuit $L^1$—$L^2$ is supplied with current by a generator G driven by an induction motor M and said motor also drives an exciter E for supplying current of substantially constant voltage to the circuit $L^3$—$L^4$.

Each of the motor field windings F has an adjustable rheostat 10 connected in series therewith and the field winding GF of generator G is connected across lines $L^3$—$L^4$ in series with an adjustable rheostat 11. Rheostat 11 is provided with a direct current operating motor 12 having an armature $a$, and a pair of series field windings $f^1$, $f^2$, and said motor is controlled by a pair of normally open push buttons 13 and 14. Push button 13 when closed connects the armature $a$ and field winding $f^1$ of motor 12 across lines $L^3$—$L^4$ to provide for operation of said motor in a direction to effect exclusion of resistance from the field circuit of the generator by rheostat 11 and push button 14 when closed connects the armature $a$ and field winding $f^2$ across said lines to provide for operation of said motor in an opposite direction. As is apparent, the speed of any one of the motors $M^1$, $M^2$ and $M^3$ may be varied by adjustment of its associated field rheostat 10 and the speed of all of said motors may be varied simultaneously by adjustment of rheostat 11.

A plurality of relays 15, 16 and 17 are associated with the motors $M^1$, $M^2$ and $M^3$, respectively. Each of said relays is provided with a pair of operating windings $a$ and $b$ which act cumulatively to effect response thereof, and each is also provided with a set of normally closed contacts $c$ and a set of normally open contacts $d$. Each of said relays has its operating winding $b$ connected across lines $L^1$, $L^2$ and its operating winding $a$ connected across lines $L^3$, $L^4$, and each of the latter windings has a rheostat 18 connected in series therewith. The rheostats 18 of relays 15, 16 and 17 are mechanically connected to the rheostats 10 of motors $M^1$, $M^2$ and $M^3$, respectively, and each of the rheostats 18 is arranged to move in a direction to include resistance when its associated rheostat 10 is moved in a direction to exclude resistance. The contacts $c$ of relays 15, 16 and 17 are connected in series with the push button 13 and the contacts $d$ of each of said relays are arranged to shunt push button 14.

The function and operation of the relays 15, 16 and 17 will now be more fully described. With the operating windings $a$ of said relays connected as above described each of said relays is subjected to an operating force which varies as the speed of its associated motor varies due to field regulation thereof. In other words, if any one of the rheostats 10 is operated to weaken the field of its associated motor the rheostat 18 connected thereto is operated to effect a corresponding increase in the current traversing the winding $a$ of the relay associated with such motor. Also since the windings $b$ of relays 15, 16 and 17 are connected across lines $L^1$, $L^2$ each of said relays is subjected to an operating force which varies as the speed of its associated motor varies due to variation of the voltage of the current supplied by generator G. Thus each of the relays 15, 16 and 17 is subjected to an operating force which is a function of the actual speed of its associated motor, and each of said relays is set to respond when the speed of its associated motor is increased to a given dangerous value.

With all of the relays 15, 16 and 17 in normal position as shown in the drawing push button 13 when depressed establishes an energizing circuit for the armature $a$ and field winding $f^2$ of motor 12 extending through the contacts $c$ of said relays. As hereinbefore stated the motor 12 then operates in a direction to cause rheostat 11 to exclude resistance from the field circuit of the generator. The field winding GF of the generator is thus strengthened to effect an increase in the voltage of the current supplied by said generator to lines $L^1$, $L^2$. Assuming that the voltage of the current supplied to lines $L^1$—$L^2$ is increased until the speed of one of the motors $M^1$, $M^2$ or $M^3$ is increased to the aforementioned dangerous value the relay associated with said motor will then respond to open its contacts $c$ and thereby render the push button 13 ineffective to further increase the voltage of the current supplied by generator G. On the other hand, if any one of the field rheostats 10 is so adjusted that its associated motor tends to operate at a dangerous speed the relay associated with such motor will respond to effect a decrease in the voltage of the current supplied by generator G. For example, if the field rheostat 10 of motor $M^1$ is so adjusted that the speed of said motor tends to exceed the aforementioned given dangerous value relay 15 will respond and its contacts $15^d$ will then establish an energizing circuit for the armature $a$ and field winding $f^1$ of motor 12. As hereinbefore stated, the motor 12 then operates in a direction to cause rheostat 11 to include resistance in the field circuit of the generator and the field winding GF of the generator is thus weakened to effect a decrease in the voltage of the current supplied to lines $L^1$—$L^2$. Relay 15 remains in its attracted position until the generator voltage is reduced to a value which prevents operation of motor $M^1$ at a dangerous speed, whereupon said relay drops out to prevent a further decrease in the generator voltage. It will be noted that when the generator voltage is reduced as above described to prevent operation of one of the motors at a dangerous speed the speed of the other motors will be reduced, and thus the result actually obtained is a change in the speed ratio of the former motor with respect to the latter motors.

In connection with the foregoing it is apparent that the number of driving motors may be increased or decreased as desired. Furthermore it is apparent that the system may be provided with control switches for starting and stopping the several motors individually or as a group.

What I claim as new and desire to secure by Letters Patent is:

1. The combination with a variable voltage supply circuit, of a plurality of motors each having an armature and a field winding, the armatures of said motors being connected in parallel across said supply circuit, means for energizing the field windings of said motors and for regulating the field strength of each of said motors to provide for speed variation thereof with respect to the other of said motors, means for varying the voltage of said supply circuit to effect simultaneous variation of the speed of all of said motors and means for automatically controlling said last mentioned means to prevent operation of any one of said motors above a predetermined maximum speed.

2. The combination with a variable voltage supply circuit, of a plurality of motors each having an armature and a field winding, the armatures of said motors being connected in parallel across said supply circuit, means for energizing the field windings of said motors and for regulating the field strength of each of said motors to provide for speed variation thereof with respect to the other of said motors, means for varying the voltage of said supply circuit to effect simultaneous variation of the speed of all of said motors, and a speed responsive device associated with each of said motors, each of said devices providing for automatic control of said last mentioned means to prevent operation of its associated motor above a predetermined maximum speed.

3. The combination with a variable voltage supply circuit and a supply circuit of substantially constant voltage, of a plurality of motors each having an armature connected across said former circuit and a field winding connected across said latter circuit, means for varying the voltage of said variable voltage circuit to effect simultaneous variation of the speed of all of said motors, field control means associated with each of said motors for varying the speed thereof with respect to the other of said motors and a speed responsive relay associated with each of said motors, each of said relays being adapted to control said first mentioned means to prevent operation of its associated motor above a predetermined maximum speed.

4. The combination with a variable voltage supply circuit and a supply circuit of substantially constant voltage, of a plurality of motors each having an armature connected across said former circuit and a field winding connected across said latter circuit, means for varying the voltage of said variable voltage circuit to effect simultaneous variation of the speed of all of said motors, field control means associated with each of said motors for varying the speed thereof with respect to the other of said motors, a relay associated with each of said motors for controlling said first mentioned means to prevent operation of its associated motor above a predetermined maximum speed, each of said relays having an operating winding connected across said variable voltage supply circuit and a second operating winding connected across said constant voltage supply circuit, and means associated with each of said relays for rendering the current in its last mentioned winding inversely proportional to the field strength of its associated motor.

5. The combination with a variable voltage supply circuit and a supply circuit of substantially constant voltage, of a plurality of motors each having an armature connected across said former circuit and a field winding connected across said latter circuit, field control means associated with each of said motors for varying the speed thereof with respect to the other of said motors, a motor driven device for varying the voltage of said variable voltage circuit to effect simultaneous variation of the speed of all of said motors, manual means for controlling said device and automatic means associated with said manual means and adapted to control said device to prevent operation of any one of said motors above a predetermined speed.

6. The combination with a variable voltage supply circuit and a supply circuit of substantially constant voltage, of a plurality of motors each having an armature connected across said former circuit and a field winding connected across said latter circuit, field control means associated with each of said motors for varying the speed thereof with respect to the other of said motors, a motor driven device for varying the voltage of said variable voltage circuit to effect simultaneous variation of the speed of all of said motors, manual means for controlling said device and automatic means associated with said manual means and adapted to control said device to prevent operation of any one of said motors above a predetermined speed, said automatic means including a relay associated with each of said motors and responsive upon a given speed of its associated motor to render said manual means ineffective and to also render said motor driven device operative to decrease the voltage of said variable voltage circuit.

PAISLEY B. HARWOOD.